March 15, 1955     R. W. DRIER     2,704,043

PICK-UP DEVICE FOR CATAPULTED PLANES

Filed Oct. 26, 1951

DIRECTION OF MOVEMENT OF SLED

COMPRESSED AIR IN

WATER OUT

WATER IN

*INVENTOR:*
ROY W. DRIER
BY
ATT'YS

United States Patent Office 2,704,043
Patented Mar. 15, 1955

2,704,043

PICK-UP DEVICE FOR CATAPULTED PLANES

Roy W. Drier, Calumet, Mich.

Application October 26, 1951, Serial No. 253,256

9 Claims. (Cl. 114—43.5)

This invention relates to an apparatus for locating a moving water-borne vehicle.

More specifically, the invention relates to a position and size-marking apparatus for use with water-borne sled devices used for recovering seaplanes at sea.

It is well known in the art to utilize water-borne sled devices towed by ships on which a seaplane is to be carried as a landing platform for seaplanes. U. S. Patent 1,828,251, granted to W. Kiwull on October 20, 1931, and U. S. Patent 2,418,478, granted to G. A. Ott et al. on April 8, 1947, are examples of such landing sled devices.

Because of the size and design of these water-borne sleds, seaplane pilots have experienced difficulties in precisely locating and determining the width of these sled devices while preparing to make a landing thereon.

Accordingly, one object of the instant invention is to provide an apparatus which will enable a seaplane pilot to more readily locate the position and size of a water landing sled device.

Another object of the instant invention is to provide an apparatus for locating water-borne vehicles which is of simple and economical construction.

These and other objects of the instant invention will become apparent upon making reference to the specification to follow and the drawings wherein.

One aspect of the instant invention includes an apparatus for providing two vertical streams of water from the sides of the sled device to indicate the width and location of the sled device. Another aspect of the invention is in providing means for coloring the water stream to make it more readily visible.

Figure 1:
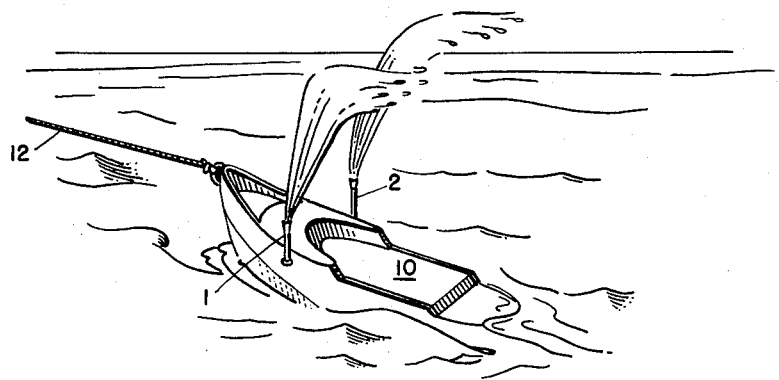
Figure 1 is a view of the water sled showing part of the position location device extending therefrom.

Referring now to Figure 1, a water sled 10 is shown on which the seaplane is to land and be anchored in a manner old in the art such as described in U. S. Patents 2,418,478 and 1,828,251, previously cited. Since the present invention does not relate to the design of the sled per se, the details of the sled 10 have been omitted from this description and drawings for purposes of simplicity.

Protruding from the side portions of sled 10 are respective water discharge pipes 1 and 2 from which respective vertical columns of water are extended disclosing the location and approximate width of sled 10. A tow cable 12 is provided which connects sled 10 to the ship on which the seaplane (not shown on the drawings) is to be carried. As will be hereinafter explained in more detail, an air hose 8 is located within the tow cable 12 which carries compressed air from the tow ship to the marker device shown in more detail in Figures 2 and 3. The compressed air aids in extruding water from discharge pipes 1—2.

Figure 2:
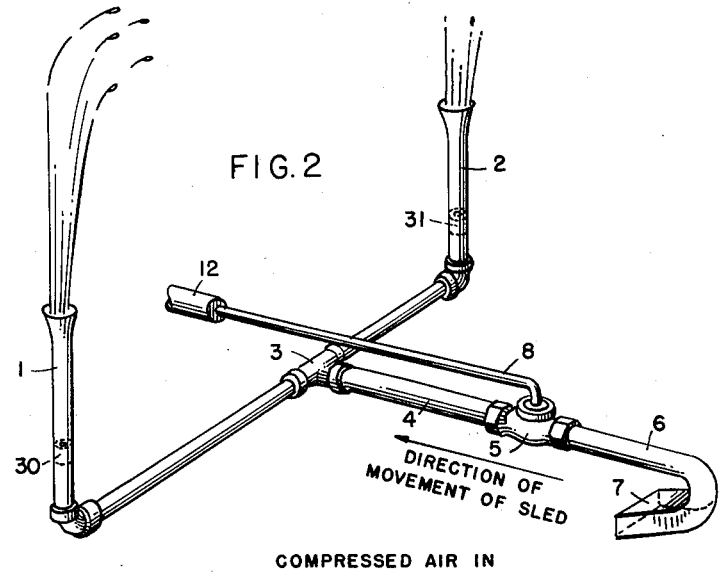
Figure 2 is a perspective view of the position indicating apparatus making up the instant invention.

Referring now to Figure 2, the discharge pipes 1—2 connect to the output passageway of a mixing valve 5 (shown in detail in Figure 3) through a T-junction 3 and a fluid conduit or pipe 4. Connected to the input passageway of mixing valve 5 is an air hose 8 which leads to a source of compressed air on the tow ship (not shown) through tow line 12, and a water intake funnel 7 which protrudes from the bottom of sled 10. The opening of funnel 7 faces the direction in which sled 10 is moving and thus in effect scoops up water which is forced through the system with appreciable pressure, the magnitude of which depends on the speed of sled 10. The compressed air fed through hose 8 adds to the pressure forcing the water up through the discharges pipes 1—2.

Figure 3:
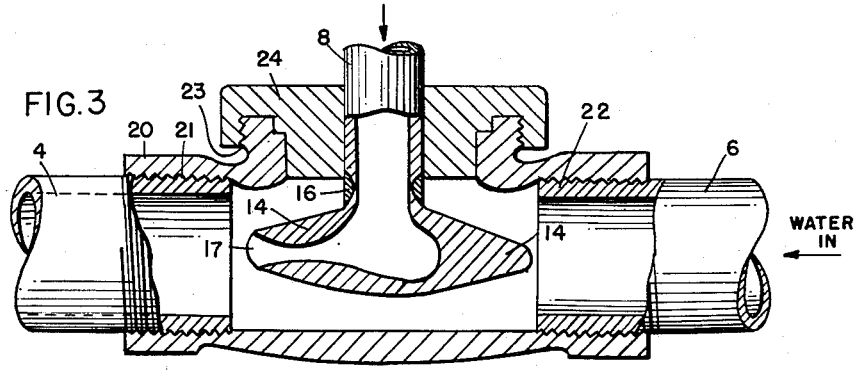
Figure 3 is an elevational view in partial cross section of the mixing valve 5 shown in Figure 2.

As shown in Figure 3, the mixing valve 5 includes a body portion 20 having thread portion 21—22 to which conduits 6 and 4 leading respectively to intake funnel 7 and water discharge pipes 1—2 are screwed.

The end of air hose 8 connects to nozzle means 14 by a strap 16. Nozzle means 14 is designed to direct a high velocity stream of air from passageway along the direction of water flow from intake conduit 6. The mixture of water and air flows out of valve 5 through conduit 4 at a high pressure and thus causes a high column of water to shoot out of the discharge pipes 1 and 2.

Body portion 20 of valve 5 also includes a circular opening 23 which is threaded about its periphery to receive a circular valve cup 24 through which air hose 8 protrudes. Valve cup 24 of course allows ready access to nozzle 14 for repairs, etc.

To color the water, the water is passed through respective dyeing chambers 30—31 located in discharge pipes 1 and 2. Of course, the dye chamber may be located in any other part of the water conduit system if desired.

Dye chambers 30 and 31 contain a suitable dye material in crystalline or powdered form which is readily dissolved or mixed with the water passing through the chamber. Since the invention is not directed to the details of the dyeing apparatus which is obviously old in the art, the details thereof have been omitted from the drawings and description thereof for purposes of simplicity.

The instant invention thus provides a simple and economical arrangement of apparatus for marking the size and location of water-borne vehicles.

It should be understood that many modifications may be made of the specific embodiment herein described without deviating from the broader aspects of the instant invention.

I claim:

1. In a water sled device for recovering objects from a body of water, apparatus for indicating the width and location of said sled device comprising a pair of open-ended discharge pipes extending upward respectively from each side of such sled device, a water intake funnel extending from the bottom portion of said sled device with its open end facing in a direction forwardly of the said sled device, a mixing valve having input and output passageways, a source of compressed air, respective fluid conduit means connecting said source of compressed air and said water intake funnel to the input passageway of said mixing valve where the compressed air and water are mixed, and fluid conduit means connecting the output passageway of said mixing valve to the said water discharge pipes whereby a vertical column of water is extruded from said discharge pipes thereby locating the width and location of said sled device.

2. The combination as described comprising a pair of similar upward extending open-ended discharge pipes spaced apart to indicate the width and location of a pick-up device, a water intake funnel below said discharge pipes having its open end facing generally forward in a direction transversely of a line connecting said discharge pipes, a mixing valve having input and output passageways, a compressed air intake conduit, respective fluid conduit means connecting said compressed air intake conduit and said water funnel to the input passageway of said mixing valve where the compressed air and water are mixed, and fluid conduit means connecting the output passageway of said mixing valve to said discharge pipes.

3. The combination of claim 1 characterized further by a water coloring means locating in at least one of the said fluid conduits for further distinguishing the liquid emitted from said discharge pipes.

4. Position marking apparatus for a water-borne vehicle comprising a water intake funnel-shaped member facing in the direction forwardly of said vehicle for scooping up water when the vehicle is in motion, and water discharge nozzle means connecting with said water intake funnel for directing at least one column of water vertically upward from one side of said water-borne vehicle.

5. The combination of claim 4 characterized further by means for coloring and thereby further distinguishing the water emitted by said nozzle means.

6. The combination of claim 4 characterized further by a compressed air hose extending from said apparatus to a compressed air source on a nearby ship and communicating with said discharge nozzle for aiding in the discharge of the water through said nozzle means.

7. The combination of claim 4 characterized further by a source of compressed air communicating with said discharge nozzle means for aiding the discharge of water therethrough.

8. In a water-sled device for recovering water-borne vehicles, an open-ended discharge pipe extending upwardly at each side of the device for indicating the location and width thereof, a mixing valve having connections with the lower ends of the discharge pipes and also having a water inlet, a fluid pressure source of supply connected from a nearby ship to the mixing valve and operative therethrough to discharge water from the upper ends of the discharge pipes to locate the said device.

9. In a water sled according to claim 8 adapted to be towed by a ship, and having a fluid pressure pipe included with the tow line so that the fluid under pressure produces a water discharge from the upper ends of the side discharge pipes to visibly indicate the lateral limits of the sled device.

References Cited in the file of this patent

UNITED STATES PATENTS

| | | |
|---|---|---|
| 718,466 | Jobin | Jan. 13, 1903 |
| 1,828,251 | Kiwull | Oct. 20, 1931 |
| 1,885,889 | Beam | Nov. 1, 1932 |
| 1,937,973 | Mayo | Dec. 5, 1933 |
| 2,418,478 | Ott | Apr. 8, 1947 |
| 2,551,497 | Lee | May 1, 1951 |

OTHER REFERENCES

Publication: "The Sunday Star," a newspaper. The reference is a drawing at the upper left corner of page 8 of the issue of January 8, 1941.